United States Patent [19]

Boring

[11] 4,422,810

[45] Dec. 27, 1983

[54] APPARATUS FOR TRANSPORTING PNEUMATICALLY SUSPENDED PARTICULATES FROM A SOURCE TO A PLURALITY OF RECEIVERS

[75] Inventor: Douglas J. Boring, Franklin, Pa.

[73] Assignee: Conair, Inc., Franklin, Pa.

[21] Appl. No.: 971,344

[22] Filed: Dec. 20, 1978

[51] Int. Cl.³ .................. B65G 53/26; B65G 53/52
[52] U.S. Cl. ................................ 406/156; 406/168; 406/191
[58] Field of Search ............... 406/155, 156, 168, 171, 406/173, 175, 191

[56] References Cited

U.S. PATENT DOCUMENTS

| | | | |
|---|---|---|---|
| 478,473 | 7/1892 | Schulze | 406/156 X |
| 3,144,276 | 8/1964 | Ortiz | 406/155 |
| 3,314,734 | 4/1967 | Lewis | 406/191 X |
| 3,386,773 | 6/1968 | Ballard | 406/156 X |
| 3,708,208 | 1/1973 | Fuss | 406/155 X |

FOREIGN PATENT DOCUMENTS

| | | | |
|---|---|---|---|
| 922339 | 1/1955 | Fed. Rep. of Germany | 406/156 |
| 1506965 | 8/1969 | Fed. Rep. of Germany | 406/156 |
| 1812154 | 8/1969 | Fed. Rep. of Germany | 406/156 |
| 129127 | 10/1959 | U.S.S.R. | 406/156 |

Primary Examiner—James L. Rowland

[57] ABSTRACT

An apparatus of transporting pneumatically suspended particulates from a source to a plurality of receivers and, more particularly, an apparatus for such conveying offering an improved means to minimize material blockage of the primary and branch delivery conduits when switching primary feed of the suspended particulates from one receiver to another.

8 Claims, 5 Drawing Figures

U.S. Patent   Dec. 27, 1983   4,422,810

APPARATUS FOR TRANSPORTING PNEUMATICALLY SUSPENDED PARTICULATES FROM A SOURCE TO A PLURALITY OF RECEIVERS

BACKGROUND OF THE INVENTION

Pneumatic conveying generally is utilized to transport dry, free-flowing, granular or pulverant material in suspension within a suitable conduit such as a pipe or duct by means of a high velocity airstream or by suction. A principal use of pneumatic conveying which has grown significantly in recent history is in the plastic processing industry wherein particulate such as plastic pellets or powdery resin is fluidized or suspended in a relatively contamination free airstream for transportation from bulk containers to a plurality of downstream plastic processing loaders.

With many prior pneumatic conveying systems, such as plastic material transporting systems, the primary material conduit is located upwardly of the receiving stations and branch conduits extend downwardly from the primary conduit and communicate with the material receivers. In such instances the primary conduit generally extends continuously across the juncture with the branch conduits and the selective material flow from the primary conduit to the respective receivers was often controlled by valves positioned in the primary conduit or the branch conduits adjacent the receivers.

The means of controlling material flow by the inclusion of a multiplicity of conduit valves is extremely expensive, requires constant maintenance and often results in clogging of the primary and/or branch transporting conduits. On this latter point it is noted that in the event of the cessation of vaccum by closing the valve of a downstream receiver for the purpose of directing the particulate stream to an upstream receiver, the inertia of the particulate in suspension will carry past the juncture of the primary conduit with the upstream receiver and settle and build up in the primary conduit at a location intermediate the upstream and downstream receiver. Such a settling and build up of particulate can result in subsequent rough material flow, decreased efficiency and, on occasion, complete system blockage. Furthermore, depending on exactly where the valves are located, or indeed if conduit valves are utilized, the particulate inertia, coupled with normal gravitational forces, may result in blockage of any one or more of the downwardly extending branch conduits.

SUMMARY OF THE INVENTION

The present invention utilizes a primary conduit having a series of diverter means disposed therein at the juncture of the primary conduit with the branch conduits, to overcome the hereinabove mentioned problems, or in the least, greatly alleviate them. More specifically the diverter means include a "Y" configuration juncture such that the flow path of the suspended particulate within the primary conduit will be stepped upwardly at the juncture. Thus the inertia of the particulate will be reduced at these juncture points to a degree that it will not be sufficient to carry over from the juncture when the vacuum to an adjacent downstream receiver is discontinued. Furthermore, by providing the diverter means with an elbow prior to connection to the branch conduit, the inertia of the particulate tending to enter the branch conduit is also reduced. This inertia reduction at the elbow will reduce the amount of particulate entering the branch conduit (and being acted upon by gravity to compact and perhaps clog the branch conduit) upon cessation of vacuum to the respective receiver therefore.

Accordingly, it is one object of this invention to provide a new and improved apparatus for the transportation of pneumatically suspended particulate through a single primary conduit to a plurality of spaced receivers having improved means for preventing the build up of particulate within the primary conduit.

Another object of this invention is to provide an improved means for inhibiting the build up of particulate within the branch conduits of receivers no longer having vacuum applied thereat.

A still further object of this invention is to provide a new and improved apparatus for the transportation of pneumatically suspended particulate through a primary conduit to a plurality of spaced receivers which does not require mechanical valving means at all of the junctures of the primary conduit with the branch conduits.

BRIEF DESCRIPTION OF THE DRAWINGS

These and other objects of the present invention will become more readily apparent upon a reading of the following description and drawings in which.

DESCRIPTION OF THE PREFERRED EMBODIMENT

Figure 1:
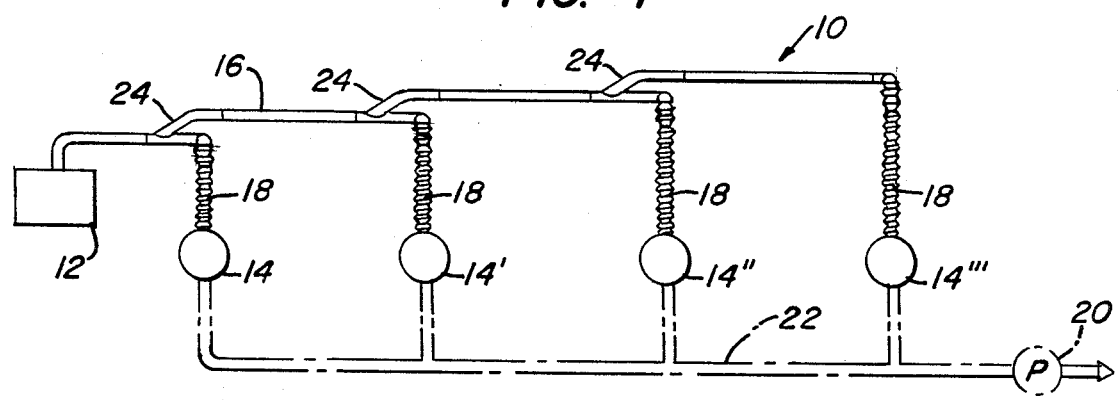
FIG. 1 is a schematic representation of a multi-receiver pneumatic transporting system constructed and operational in accordance with the principles of the present invention.
Figure 2:
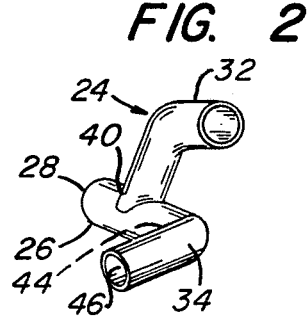
FIG. 2 is a projection of diverter means of the present invention which is disposed in the primary conduit of the FIG. 1 system at the junctures thereof with the branch conduits.
Figure 3:
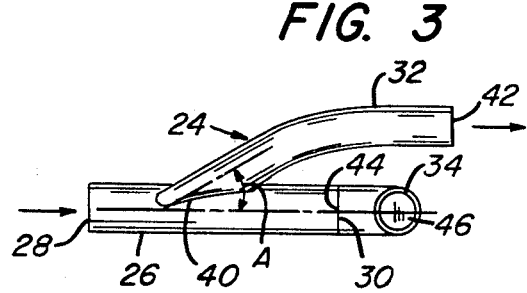
FIG. 3 is a side elevational view of the diverter means illustrated in FIG. 2.
Figure 4:
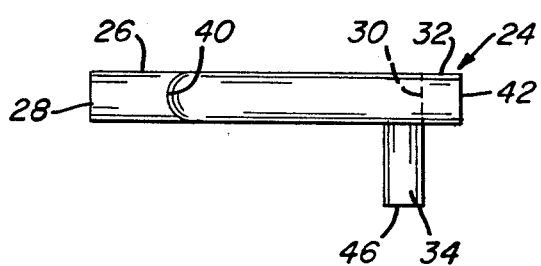
FIG. 4 is a top view of the diverter means as viewed on lines 4—4 of FIG. 3.
Figure 5:
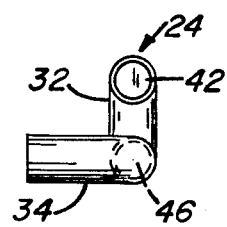
FIG. 5 is an end view of the diverter means as viewed on lines 5—5 of FIG. 3.

FIG. 1 is a schematic representation of a multi-receiver pneumatic transporting system 10 of the present invention which, as shown, is of a type commonly used in the plastics processing industry.

System 10 comprises: an upstream material source 12, a plurality, as shown four material receivers which are located downstream of the source 12 and are consecutively identified at 14, 14', 14" and 14''', with receiver 14 being the receiver most closely adjacent source 12; a primary material transporting conduit 16 which communicates at one end thereof with source 12; and a plurality of branch delivery conduits 18 which extend generally between respective material receivers and conduit 16 for the delivery of material from conduit 16 to the material receivers. A suitable vacuum pump 20 communicates with receivers 14 through 14''' by means of an exhaust conduit assembly 22. Diverter means 24 of the present invention are disposed within primary conduit 16 at the respective junctures of the branch conduits 18 of receivers 14, 14' and 14".

Inasmuch as the invention herein is primarily to the configuration and utilization of diverter means 24 and further, that the general operation of multi-receiver pneumatic transporting systems are well known in the art, a detailed description of the components and operation of system 10 are not necessary to one skilled in the art for a full understanding of the invention herein.

System 10 is made operative by energizing vacuum pump 20 and opening one or more suitable valves (not shown) in or adjacent receivers 14 through 14''' to cause operative communication between pump 20 and material source 12, via conduit assembly 22, branch conduits 18 and the primary conduit 16. The particulate material, for example plastic pellets or the like, is entrained in the downstream flowing air stream and the particulate laden stream continuously enters primary conduit 16. If for example, the particulate material is to be fed solely to material receiver 14, the valves adjacent receivers 14', 14'' and 14''' are suitably positioned to an off position to discontinue communication between these latter mentioned receivers and the exhaust conduit assembly 22. It is particularly to this type of condition (i.e. when an exhaust communication with a downstream receiver is discontinued) that one primary aspect of the diverter means 24 of this invention is directed.

Referring to FIGS. 2 through 5, diverter means 24 comprises: an elongated generally cylindrical main body member 26 having an upstream end 28 and a downstream end 30; an elongated generally cylindrical "Y" diverter or transition member 32 which has the upstream or lower end 40 thereof in open communication with member 26 intermediate ends 28 and 30 and which slopes upwardly and downstream therefrom at an acute angle with respect to the longitudinal axis of member 26 in a manner that the longitudinal axis of the uppermost end portion of member 32, passes through the downstream end 42 of member 32, is upwardly spaced from and extends in a direction generally parallel to the longitudinal axis of member 26; and an elbow member 34, shown as a 90° elbow, which has the upstream end 44. thereof secured in coaxial alignment to the downstream end 30 of member 26 and extends horizontally outwardly therefrom in a manner that the other or downstream end 46 thereof is displaced 90° from downstream end 30.

Diverter means 24 is disposed within the primary material conduit 16 at each takeoff therefrom to a material receiver 14 through 14''' in a manner that the upstream and downstream ends 28 and 30 are suitably sealingly secured, such as by friction fits or cylindrical sleeves, to respectively adjacent intermediate ends 40 and 42 of conduit 16 to thus provide a continuous flow path for the particulate laden stream from the material source 12 to the final downstream material receiver 14'''. Similarily, the downstream end 46 of elbow member 34 is suitably sealingly secured, such as by friction fits or cylindrical sleeves, to the upper or upstream end of the respective branch delivery conduits 18. As shown branch conduits 18 are formed of flexible material, such as corregated hollow cylindrical tubing. Thus conduits 18 may be flexed to provide the necessary routing of the takeoff flow path for the particulate laden airstream from the conduit 16 to the downwardly spaced material receivers 14 through 14'''. If such receivers are additionally spaced laterally from conduit 16 then the conduits 18 may be routed for a horizontal traverse and a subsequent vertical drop or may be sloped on a downwardly extending diagonal if preferred.

With such an arrangement and configuration of elements as discussed hereinabove, a means and method is provided for the selective conveying of pneumatically suspended particulate through the single primary conduit 16 to a plurality of spaced receivers 14 through 14''' with a minimum of buildup on clogging of particulate within the conduits 16 and 18. Specifically because of the greater density of the particulates relative to the fluid in the airstream within which they are suspended, the particulate has a greater inertia within the flowing stream and will resist switching. Thus, when it is desired to cease loading of, for example, a downstream receiver and the vacuum applied thereto through exhaust conduit assembly 22 is discontinued, the inertia of the particulate within the conduit 16 will result in the particulate flow not being immediately responsive to such a vacuum discontinuance. In the event that no means are provided within conduit 16 to slow or decrease the inertia of the particulate, the particulate, because of inertia, will carry over into the portion of conduit 16 which lends directly to the receiver for which vacuum feed is discontinued. Thus, the carryover particulate will settle in this portion of the conduit 16 and may clog the conduit 16 or cause uneven material flow therethrough when vacuum is again applied at the downstream receiver. However, the present invention provides a diverter means 24 at each juncture of the primary conduit 16 with a branch conduit 18. The diverter means 24 includes a "Y" diverter member 32 which steps up the elevation of the conduit 16 at each juncture. Thus, the change in elevation of conduit 16 will slow the inertia and inhibit the flow of particulate past the diverter means when downstream vacuum is discontinued. As discussed before the "Y" diverter member 32 slopes upwardly at an acute angle with respect to the longitudinal axis of the main body member 26. This angle, which is indicated at "A" in the Figures, should not be so large that it results in unduly inhibiting the relatively free flow of the particulate laden stream when vacuum is present at all receivers, nor should it be so small as to not substantially decrease the particulate inertia when vacuum to downstream receivers is decreased. It has been found that an angle "A" of the upward slope of the diverter member 32, with respect to the longitudinal axis of the main body member 26 in the general range of fifteen to sixty five degrees is preferred.

For similar reasons, the particulate inertia also creates a potential buildup problem in the branch conduits 18. For this reason the diverter means 24 is provided with the elbow member 34. Elbow member 34 acts to decrease the inertia of the particulate and thus prevent a substantial carryover into conduits 18 when the vacuum for the respective material receiver therefor is discontinued. The preferred range for elbow member 34 is a maximum elbow of ninety degrees and a minimum elbow of sixty degrees, the latter elbow providing a slight reversal in flow which even further reduces the particulate inertia.

The embodiment described herein is the presently preferred embodiment of a means for transporting pneumatically suspended particulates from a source to a plurality of receivers which is constructed in accordance with the principles of the invention; however, it is understood that various modifications may be made to the embodiments described herein by those knowledgeable in the art without departing from the scope of the invention as is defined by the claims setforth hereinafter. For example: connecting sleeves for members 26, 32 and 34 may be utilized rather than the weldment as illustrated; the diverter means 24 may be formed without the elbow member 34 if desired; the branch conduits 18 may be formed as rigid members, if desired; and the like.

I claim:

1. A vacuum conveying system for transporting pneumatically suspended particulates from an upstream particulate source to a plurality of downstream particulate receiving means comprising: a continuous primary material transport conduit having a plurality of elongated generally horizontally extending conduit portions with each downstream extent of said conduit portions being spaced below the adjacent upstream extent of the downstream adjacent one of said conduit portions; said primary material transporting conduit having adjacent ones of said conduit portions connected by transition conduit portions, respectively, a plurality of particulate receiving means, branch conduits communicating between said particulate receiving means and said conduit portions downstream of the upstream section of said transition conduit portions, respectively; vacuum producing means for obtaining a vacuum in a selected one of said particulate receiving means whereby pneumatically suspended particulate from such a source are transporatable by suction to said selected one of said particulate receiving means; and each of said transition portions extending at an upward acute angle with respect to the central axis of the downstream conduit portion of said conduit portions connected thereby to inhibit the flow of particulate therethrough when said vacuum producing means discontinues the vacuum to said selected one of said particulate receiving means.

2. A conveying system as specified in claim 1 wherein the central longitudinal axes of said conduit portions are parallel.

3. A conveying system as specified in claim 1 wherein said acute angle is in the range of fifteen to sixty-five degrees.

4. A conveying system as specified in claim 1 wherein each of said branch conduits additionally includes an elbow portion which turns generally horizontally outwardly with respect to the longitudinal axis of the adjacent upstream conduit portion of said conduit portions.

5. A conveying system as specified in claim 4 wherein said branch conduits communicate with said conduit portions, respectively, closely adjacent the upstream ends of said transition conduit portions and downstream thereof.

6. A conveying system as specified in claim 4 wherein said elbow is at least a ninety degree elbow.

7. A conveying system as specified in claim 6 wherein at least some of said branch conduits are readily bendable.

8. A conveying system as specified in claim 1 wherein the portions of said branch conduits connected to said conduit portions are coaxial, respectively.

* * * * *